United States Patent
Li

(10) Patent No.: US 9,047,310 B2
(45) Date of Patent: Jun. 2, 2015

(54) RELIABLE, EFFICIENT PEER-TO-PEER STORAGE

(75) Inventor: Jin Li, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1670 days.

(21) Appl. No.: 11/359,276

(22) Filed: Feb. 22, 2006

(65) Prior Publication Data

US 2007/0208748 A1    Sep. 6, 2007

(51) Int. Cl.
*G06F 7/00*    (2006.01)
*G06F 17/30*    (2006.01)

(52) U.S. Cl.
CPC ............................. *G06F 17/30206* (2013.01)

(58) Field of Classification Search
USPC ............... 707/104.1, 100, 10, 3, 705
See application file for complete search history.

(56) References Cited

U.S. PATENT DOCUMENTS

| | | | |
|---|---|---|---|
| 6,308,295 B1* | 10/2001 | Sridharan et al. | 714/755 |
| 7,243,103 B2* | 7/2007 | Murphy et al. | 707/10 |
| 7,529,834 B1* | 5/2009 | Birrell et al. | 709/226 |
| 7,984,018 B2* | 7/2011 | Rodriguez et al. | 707/625 |
| 2003/0015423 A1 | 1/2003 | LaGreca et al. | |
| 2003/0145093 A1* | 7/2003 | Oren et al. | 709/229 |
| 2004/0162808 A1* | 8/2004 | Margolus et al. | 707/1 |
| 2004/0255140 A1* | 12/2004 | Margolus et al. | 713/193 |
| 2005/0004920 A1* | 1/2005 | Omori | 707/100 |
| 2005/0283537 A1 | 12/2005 | Li et al. | |
| 2006/0069800 A1* | 3/2006 | Li | 709/232 |
| 2006/0235895 A1* | 10/2006 | Rodriguez et al. | 707/200 |
| 2007/0177739 A1* | 8/2007 | Ganguly et al. | 380/277 |
| 2008/0052606 A1* | 2/2008 | Alstrup et al. | 714/784 |

FOREIGN PATENT DOCUMENTS

| | | |
|---|---|---|
| JP | 2004127168 | 4/2004 |
| JP | 2005327291 | 11/2005 |
| WO | 99/15954 A1 | 4/1999 |

OTHER PUBLICATIONS

Watanabe, K., T. Matsuzawa, Y. Inoguchi, Autonomous distributed filesystem for Campus Grid that considers reliability, Study Report of Info. Processing Soc. of Japan, Mar. 9, 2005, pp. 13-18, vol. 2005, No. 19.

(Continued)

*Primary Examiner* — Hosain Alam
*Assistant Examiner* — Eliyah S Harper
(74) *Attorney, Agent, or Firm* — Heikki Einola; Judy Yee; Micky Minhas

(57) ABSTRACT

An adaptive coding storage system that uses adaptive erasure resilient code (ERC) which changes the number of fragments used for encoding according to the size of the file distributed. Adaptive ERC may greatly improve the efficiency and reliability of P2P storage. A number of procedures for P2P storage applications may also be implemented. In one embodiment small, dynamic data files are diverted to the more reliable peers or even a server, while large and static files are stored utilizing the storage capacity of the unreliable peers. Also, for balanced contribution and benefit, a peer should host the same amount of content as it stored in the P2P network. As a result, unreliable peers are allowed to distribute less data, and more reliable peers are allowed to distribute more. Also, smaller files are assigned a higher distribution cost, and the larger files are assigned a lower distribution cost.

17 Claims, 9 Drawing Sheets

(56) References Cited

OTHER PUBLICATIONS

Blake, C., and R. Rodrigues, High availability, scalable storage, dynamic peer networks: Pick two, 9th Workshop on Hot Topics in Operating Systems (HotOS-IX), May 2003, pp. 1-6, Linhue, Hawaii.
Cuenca-Acuna, F. M., R. P. Martin, T. D. Nguyen, Autonomous replication for high availability in unstructured P2P systems, Proceedings of 22nd Int'l Symposium on Reliable Distributed Systems, Oct. 6-18, 2003, pp. 99-108, Dept. of Comput. Sci., Rutgers Univ., Piscataway, N.J., USA.
Dabek, F., M. F. Kaashoek, D. Karger, R. Morris, and I. Stoica, Wide-area cooperative storage with CFS, Proc. 18th ACM Symposium on Operating System Principles, Banff, Canada, Oct. 2001.
Dabek, F., E. Brunskill, M. F. Kaashoek, D. Karger, R. Morris, I. Stoica, H. Balakrishnan, Building peer-to-peer systems with Chord, a distributed lookup service, Proc. 8th Workshop on Hot Topics in Operating Systems, (HotOS-VIII), May 2001, pp. 81-86.
Druschel, P., A. Rowstron, Past: A large-scale, persistent peer-to-peer storage utility, Proceedings of the 8th Workshop on Hot Topics in Operating Systems, May 20-22, 2001, pp. 75-80.
Freedman, M. J., D. Maziéres, Sloppy hashing and self-organizing clusters, 2nd Int'l Peer-to-Peer Systems Workshop, IPTPS 2003, Feb. 21-22, 2003, pp. 45-55, Berkeley, CA, USA.
Kubiatowicz, J., D. Bindel, Y. Chen, S. Czerwinski, P. Eaton, D. Geels, R. Gummadi, S. Rhea, H. Weatherspoon, C. Wells, B. Zhao, OceanStore: an architecture for global-scale persistent storage, Proc. of the 9th Int'l Conf. on Architectural Support for Programming Languages and Operating Systems, 2000, pp. 190-201, Cambridge, Massachusetts.
Li, J., The efficient implementation of Reed-Solomon high rate erasure resilient codes, Proc. IEEE Int'l Conf. on Acoustics, Speech, and Signal Processing, (ICASSP '05), Mar. 18-23, 2005, pp. 1097-1100, vol. 3.
Maymounkov, P., D. Maziéres, Kademlia: A peer-to-peer information system based on the XOR metric, 1st Int'l Workshop on Peer-to-Peer Systems, 2002, pp. 53-65, vol. 2429, Springer-Verlag, London, UK.
Ratnasamy, S., P. Francis, M. Handley, R. Karp, and S. Shenker, A scalable content-addressable network, Proc. ACM SIGCOMM '01 Conf., San Diego, CA, Aug. 2001.
Rowstron, A., and P. Druschel, Pastry: Scalable, distributed object location and routing for large-scale peer-to-peer systems, Proc. IFIP/ACM Int'l Conf. on Distributed Systems Platforms (Middleware 2001), Heidelberg, Germany, Nov. 2001.
Zhang, Z., Q. Lian, Reperasure: replication protocol using erasure-code in peer-to-peer storage network, Proceedings of 21st IEEE Symposium on Reliable Distributed Systems, 2002, pp. 330-335.
"Office Action Received in European Patent Application No. 07750856.2", Mailed Date: Nov. 25, 2013, Filed Date: Feb. 13, 2007, 6 pages.
"Office Action Received in Korea Patent Application No. 10-2008-7020284", Mailed Date: Nov. 28, 2013, Filed Date: Feb. 13, 2007, 6 pages.
"Notice of Allowance Received in Korea Patent Application No. 10-2008-7020284", Mailed Date: Nov. 28, 2013, Filed Date: Feb. 13, 2007, 4 pages. (W/o English Translation).

\* cited by examiner

RELIABLE, EFFICIENT PEER-TO-PEER STORAGE

BACKGROUND

In a Peer-to-Peer (P2P) application, peers bring with them network bandwidth and/or hard drive storage resources when they join the P2P service. As the demand on a P2P system grows, the capacity of the system grows as well. This is in sharp contrast to a client-server system, where the server's capacity is fixed and paid for by the provider of the client-server system. As a result, a P2P system is more economical to run than a client-server system and is superior because it is scalable.

In a P2P system, the peer contributes not only the bandwidth but also to the storage space to serve the other peers. The collective storage space contributed by the peers forms a distributed storage cloud. Data may be stored into, and be retrieved from, the cloud. P2P storage can be used for a number of applications. One is distributed backup. The peer may backup its own data into the P2P cloud. When the peer fails, the data may be restored from the cloud. Another P2P application is distributed data access. Because the client may retrieve data simultaneously from multiple data holding peers, the P2P retrieval can have higher throughput compared with retrieving data from a single source. Another application is on-demand movie viewing. A media server may seed the P2P cloud with movie files preemptively. When a client is viewing the movie, it may stream the movie from both the P2P cloud and the server, thus reducing the server load, reducing traffic on the network backbone and improving the streaming movie quality.

Though the peers in the P2P network may act like servers, they differ from commercial web/database servers in one important aspect: reliability. Because a peer is usually an ordinary computer that supports the P2P application with its spare hard drive space and idle bandwidth, it is far less reliable than the typical server. The user may choose to turn off the peer computer or the P2P application from time to time. Compulsory need, for example, large file upload/download, may starve the peer from the necessary bandwidth for P2P activity. The peer computer may be offline due to the need to upgrade or patch software/hardware, or due to a virus attack. The computer hardware and the network link of the peer are also inherently much more unreliable than a typical server computer and its commercial network links, which are designed for reliability. While commercial server/server clusters are designed for "six nine" reliability (with a failure rate $10^{-6}$, at that rate, about 30 seconds of downtime is allowed each year), a good consumer peer may have only "two nine" reliability (a failure rate $10^{-2}$ or about 15 minutes of downtime every day), and it is not uncommon for peers to have only 50% (down half the time) or even 10% reliability (down 90% of the time).

Most P2P applications, for example P2P backup and data retrieval, want to maintain the same level of reliability for P2P storage as that of the server ("six nine" reliability). The challenge lies in how to build a reliable, efficient P2P store using minimum bandwidth and storage resources of the peers.

SUMMARY

An adaptive coding storage system and method for storing data efficiently and reliably in a Peer-to-Peer (P2P) network is presented. The adaptive coding storage system and method adjusts a number of fragments for erasure resilient coding (ERC), the ERC number of fragments, based on the file size stored and distributed.

A number of embodiments of the adaptive coding storage system employ procedures to improve the efficiency and reliability of a P2P network. For example, in one embodiment small, dynamic data is diverted to more reliable peers or even a server, if server component support is available. Also, in another embodiment, for a balanced P2P network, peers that are unreliable and are distributing smaller files are allowed to distribute less data.

It is noted that while the foregoing limitations in existing peer-to-peer storage and distribution systems described in the Background section can be resolved by a particular implementation of the adaptive coding storage system according to the present invention, this system and process is in no way limited to implementations that just solve any or all of the noted disadvantages. Rather, the present system and process has a much wider application as will become evident from the descriptions to follow.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the adaptive coding storage system will become better understood with regard to the following description, appended claims, and accompanying drawings where:

DETAILED DESCRIPTION

In the following description of the preferred embodiments of the present adaptive coding storage system, reference is made to the accompanying drawings that form a part hereof, and in which is shown by way of illustration specific embodiments in which the adaptive coding storage system may be practiced. It is understood that other embodiments may be utilized and structural changes may be made without departing from the scope of the present adaptive coding storage system.

Figure 1:
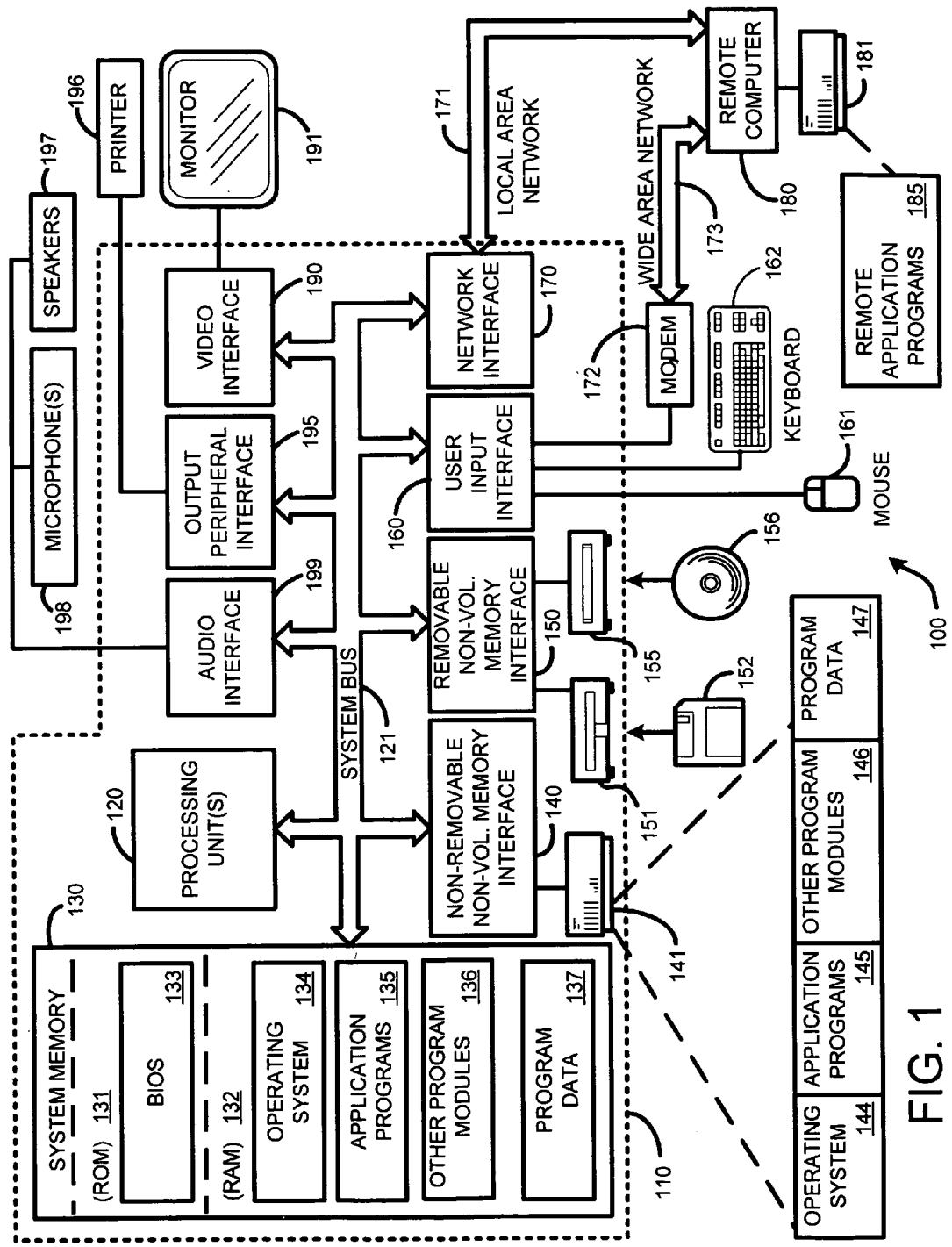
FIG. 1 is a general system diagram depicting a general-purpose computing device constituting an exemplary system implementing an adaptive coding storage system and method as described herein.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
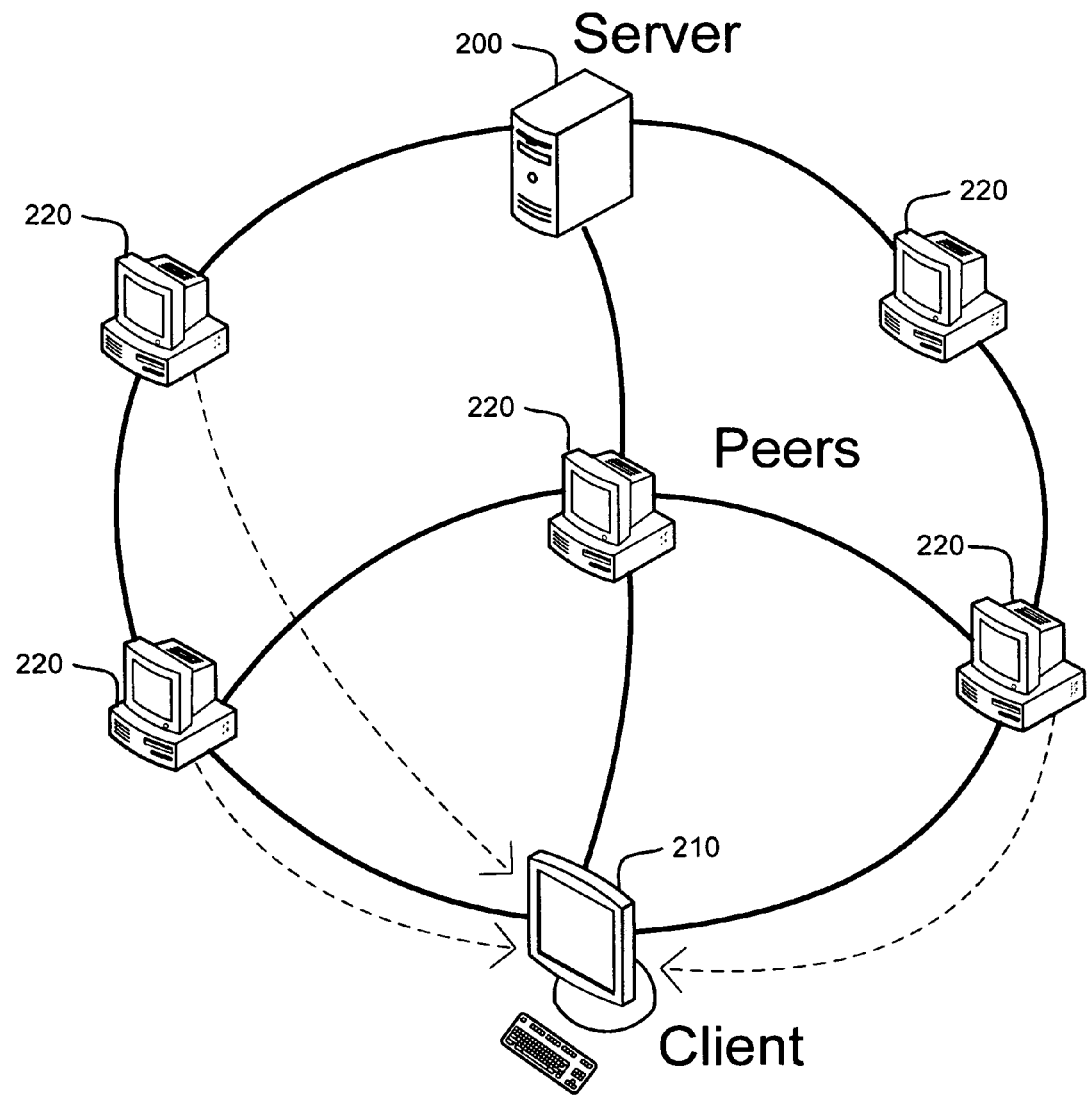
FIG. 2 illustrates an exemplary peer-to-peer (P2P) network that can be used with the adaptive coding storage system and method, as described herein.

In general, the adaptive coding storage system operates in a P2P network such as the network illustrated by FIG. 2. For a particular data streaming session, a "server" 200 is defined as a node in the P2P network that initially originates the data or streaming media; a "client" (or receiver) 210 is defined as a node that currently requests the data; and a "serving peer" 220 is defined as a node that serves the client with a complete or partial copy of the data.

In general, the server 200, the client 210 and the serving peers 220 are all end-user nodes connected to a network such as the Internet. Because the server 200 is always capable of serving the data, the server node also acts as a serving peer 220. The server node 200 can also perform administrative functionalities that cannot be performed by a serving peer 220, e.g., maintaining a list of available serving peers, performing digital rights management (DRM) functionality, and so on. In addition, as with conventional P2P schemes, the adaptive coding storage system described herein benefits from increased efficiency as more and more peer nodes 220 are deployed. In particular, as the number of peer nodes 220 increases, the load on the data server 200 will decrease, thereby becoming less costly to run, while each client node 210 will be able to receive much better data quality during a particular data transfer session.

In addition, it should be clear that the role of particular nodes may change. For example, a particular node may act as the client 210 in one particular data transfer, while acting as a serving peer 220 in another session. Further, particular nodes can simultaneously act as both client nodes 210 and servers 200 or serving peers 220 to simultaneously send one or more data files, or portions of these files, while receiving other data from one or more other serving peers.

During a data transmission, the client 200 first locates a number of close-by peers 220 that hold some or all of the desired data, and then receives the data from the multiple peers (which may include the server 200). Consequently, each serving peer 220 acts to assist the server 200 by reducing the overall upload burden by servicing a portion of the download request of the client 210. As a result, the client 210, especially in the case where there are many clients, can often receive much better data quality, as there is a significantly higher serving bandwidth available when there are many serving peers 220 to assist the server 200.

The exemplary operating environment having now been discussed, the remaining parts of this description section will be devoted to a description of the program modules embodying the adaptive coding storage system and process.

2.0 Reliable, Efficient Peer-to-Peer Storage.

The adaptive coding storage system provides an adaptive erasure resilient coding (ERC) scheme that adaptively determines whether or not to use ERC coding and employs the optimum number of fragments to be used for ERC coding for a given file size for optimal reliability and efficiency. The number of fragments used for ERC coding of a file will be termed the "ERC number of fragments" for purposes of this discussion. The following paragraphs provide a discussion of peer-to-peer (P2P) storage efficiency and reliability and the use of ERC in P2P networks, as well as a discussion of the ERC number of fragments used. Then various embodiments of the adaptive coding storage system and process are discussed.

2.1 Reliability in P2P Storage: Data Redundancy

The adhoc solution to bring reliability to a system with unreliable parts is to use redundancy. If each individual peer on the network has a reliability of p, to achieve a desired reliability of $p_0$, one may simply replicate the information to n peers:

$$n = \log(1-p_0)/\log(1-p), \quad (1)$$

where n is the number of peers holding the information. At the time of retrieval, the client may contact the information storing peers one-by-one. As long as one of the information storing peers is online, the information can be reliably retrieved.

Figure 3:
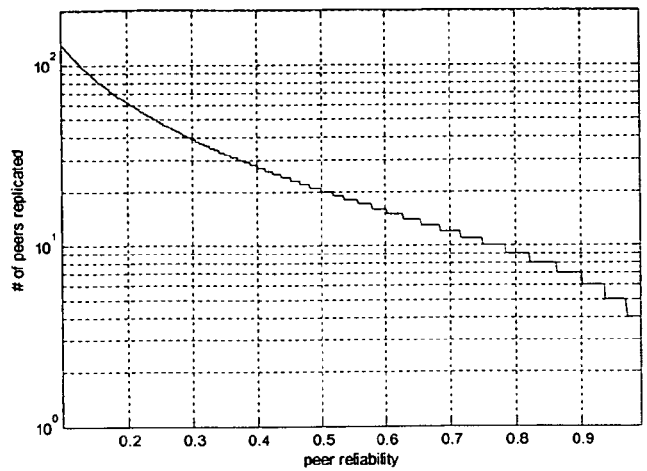
FIG. 3 provides a graph showing the number of information storing peers to achieve a desired reliability of $10^{-6}$.

Though achieving reliability, the simple replication strategy is not efficient. FIG. 3 plots the number of information storing peers needed to achieve "six nine" reliability. With peer reliability of 50%, one needs to replicate and store the information to 20 peers. This leads to 20 times more bandwidth and storage space to distribute and store the information. Obviously, efficiency has been sacrificed in exchange of information reliability.

2.2 Erasure Resilient Coding in P2P

To improve efficiency while still maintaining the same reliability, ERC can be a useful tool. ERC splits the original file into k original fragments $\{x_i\}$, i=0, . . . ,k−1, each of which is a vector over the Galois Field GF(q), where q is the order of the field. Say one is encoding a file that is 64 KB long, if one uses $q=2^{16}$ and k=16, each fragment will be 4 KB, and will consist of a 2 K word, with each word being an element of $GF(2^{16})$. ERC then generates coded fragments from the original fragments. An ERC coded fragment is formed by operation:

$$c_j = G_i \cdot [x_0 x_1 \ldots x_{k-1}]^t \quad (2)$$

where $c_j$ is a coded fragment, $G_i$ is a k-dimensional generator vector, and equation (2) is a matrix multiplication, all on GF(q). At the time of decoding, the peer collects m coded fragments, where m is a number equal to or slightly larger than k, and attempts to decode the k original fragments. This is equivalent to solve the equation:

$$\begin{bmatrix} c_0 \\ c_1 \\ \vdots \\ c_{m-1} \end{bmatrix} = \begin{bmatrix} G_0 \\ G_1 \\ \vdots \\ G_{k-1} \end{bmatrix} \begin{bmatrix} x_0 \\ x_1 \\ \vdots \\ x_{k-1} \end{bmatrix}, \quad (3)$$

If the matrix formed by the generator vectors has a full rank k, the original messages can be recovered.

There are many available ERCs. A particularly interesting one is the Reed-Solomon (RS) code. RS code uses structured generator vectors, and is maximum distance separable (MDS). As a result, any k distinctive coded fragments will be able to decode the original fragments. Another advantage of the RS code is that the coded fragment can be easily identified and managed by the index i of the generator vector, thus easing the detection of duplicate RS codes. In the following discussion of ERC, it is assumed that RS code is used. However, the adaptive coding storage system can be implemented with any number of conventional ERCs.

2.3 ERC: Number of Fragments.

By using ERC in P2P storage, a data file is distributed to more peers, but each peer only needs to store one coded fragment that is 1/k size of the original file, leading to an overall reduction in the bandwidth and storage space required to achieve the same level of reliability, and thus an improvement of efficiency. Let $n_1$ be the number of peers that the coded fragments needs to be distributed to achieve a certain desired reliability level. Since RS code is MDS code, k peers holding k distinctive coded fragments will be sufficient to recover the original file. The probability that there are exactly m peers available can be calculated via binomial distribution:

$$p(m, n_1) = \binom{n_1}{m} p^m (1-p)^{n_1-m}. \quad (4)$$

One may thus calculate $n_1$ from p, $p_0$ and k as:

$$n_1 = \underset{o}{\operatorname{argmin}} \left\{ \sum_{m<k} \binom{o}{m} p^m (1-p)^{o-m} < 1 - p_0 \right\}. \quad (5)$$

The replication ratio r is defined as:

$$r = n_1/k. \quad (6)$$

The replication ratio r is a good indicator of efficiency, as r copies of files needs to be distributed and stored into the P2P cloud.

Figure 4:
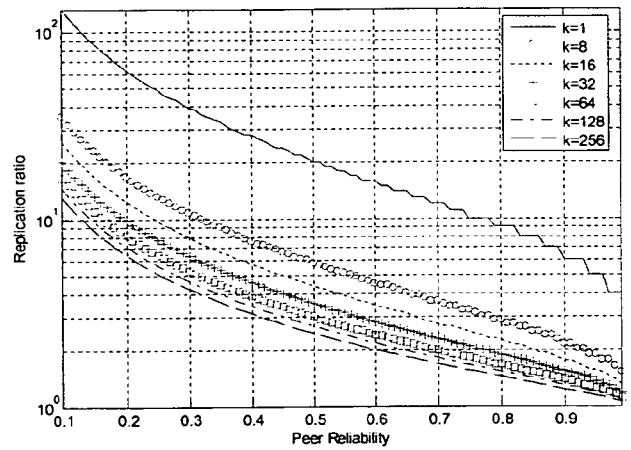
FIG. 4 provides a graph showing peer reliability and desired replication ratio.

It is shown in FIG. 4, the desired replication ratio to achieve "six nine" reliability for different ERC number of fragments k. One observes that the use of ERC greatly reduces the required replication ratio. Comparing non ERC (k=1) and ERC of number of fragments k=256, the desired replication ratio decreases from r=132 to r=13.1 for peer reliability of 10%, from r=20 to r=2.5 for peer reliability of 50%, and from r=3 to r=1.05 for peer reliability of 99%. ERC may improve the efficiency without sacrificing reliability.

One also observes that a larger ERC number of fragments further reduces the replication ratio. With a peer reliability of 50%, going from k=8 to 16, 32, 64, 128 and 256 leads to a reduction of the replication ratio from r=5.75 to 4.375, 3.53, 3.02, 2.68 and 2.48. The corresponding efficiency improvement is 24%, 19%, 15%, 11% and 8%, respectively. This seems to suggest that one should use large ERC number of fragments for more efficiency.

Figure 5:
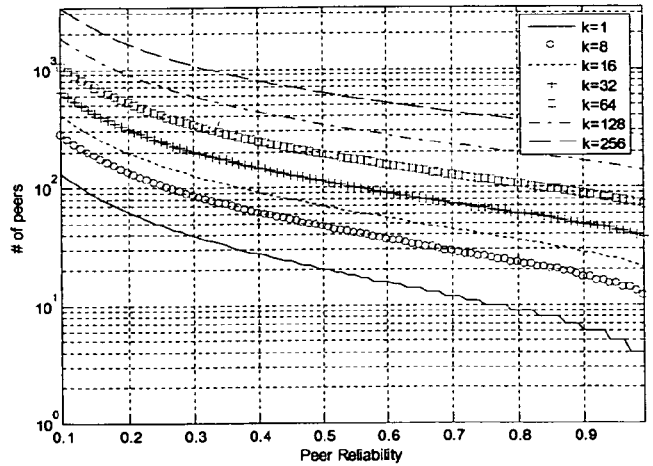
FIG. 5 provides a graph showing the number of information storing peers necessary to achieve desired reliability of $10^{-6}$ using erasure resilient coding.

However, a larger ERC number of fragments implies that more peers are needed to store and to retrieve the coded fragments. As shown in FIG. 5, the number of peers that need to hold the coded fragments to achieve the "six nine" reliability are plotted. Again with 50% peer reliability, going from k=8 to 16, 32, 64, 128 and 256 increases the number of information storing peers from $n_1$=46 to 70, 113, 193, 343 and 630. Each doubling of k results in 52%, 61%, 71%, 78%, 84% more peers needed to store the information. The doubling of k also requires at least double the number of peers to be contacted during information retrieval.

In most practical P2P networks, establishing a connection between the peers requires a non-trivial amount of overhead. One part of the overhead can be attributed to the retrieval of proper peer identity and finding the proper routing path (e.g., via a Distributed Hash Table (DHT)). Another part of the overhead is due to the need to invoke certain network address translation (NAT) algorithms, e.g., STUN (simple traversal of UDP through NAT) if one or both peers are behind the NAT. Assuming that the average overhead to establish connection between two peers is overhead (set to 16 KB in this example), one may calculate the overall network bandwidth needed to store a file of size s to be:

$$\text{store\_bandwidth} = s*r + n_1*\text{overhead}. \quad (7)$$

Figure 6:
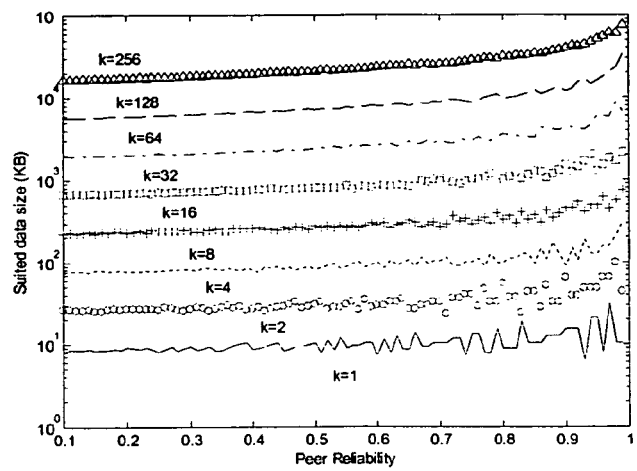
FIG. 6 provides a graph of the ERC number of fragments and the associated suited file size for information storage in a P2P network.

With equation (7), one recognizes that a larger ERC number of fragments does not always lead to the best efficiency. Instead, for a small file, a small ERC number of fragments or even non-ERC should be used. One computes the overall bandwidth required in equation (7) for different file sizes and ERC number of fragments, and plots the curves shown in FIG. 6. The boundary between different ERC number of fragments is the optimal file size range suited for a particular ERC number of fragments. For example, the bottom curve of FIG. 6 shows the file size boundary below which non-ERC should be used, and above which ERC with number of fragments k=2 should be used. An interesting observation is that the file size boundary is relatively insensitive to peer availability, which greatly simplifies the choice of the optimum ERC fragment parameter. In general, for a file smaller than approximately 10 KB, ERC should not be used. For ERC with a number of fragments k=2, 4, 8, 16, 32, 128 and 256 the most suited file size range is approximately 10-33 KB, 33-100 KB, 100-310 KB, 310-950 KB, 950 KB-2.9 MB, 2.9 MB-8.9 MB, 8.9-26 MB, >26 MB, respectively.

2.4 Adaptive ERC Scheme

Figure 7:
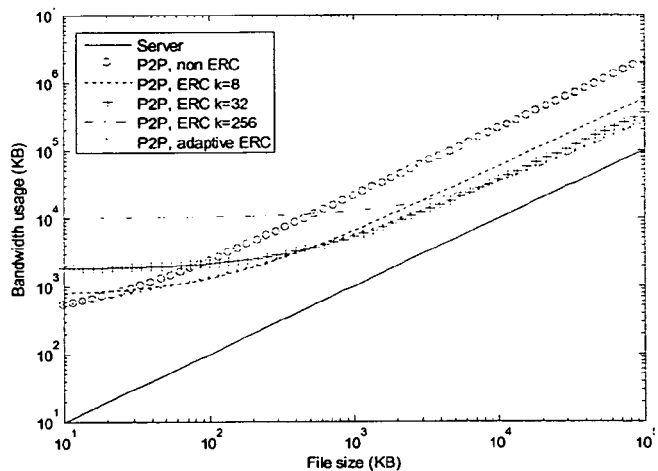
FIG. 7 provides a graph depicting bandwidth usage between peers in a P2P configuration with adaptive ERC and fixed ERC (at a peer reliability=50%).
Figure 8:
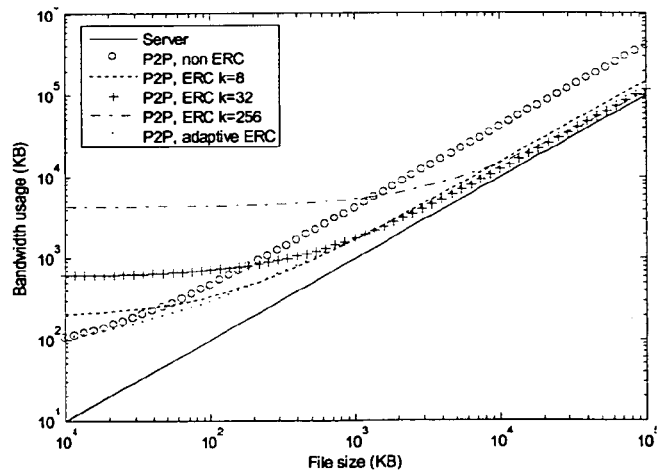
FIG. 8 provides a graph depicting bandwidth usage between peers in a P2P configuration with adaptive ERC and fixed ERC (at a peer reliability=99%).

The adaptive coding storage system and method adaptively chooses the appropriate ERC number of fragments to efficiently store content in a P2P network reliably. Using the file boundary curve established in FIG. 6, one embodiment of the system adaptively chooses to use non-ERC, and ERC with a number of fragments of k=2, 4, 8, 16, 32, 64, 128, 256 for different file sizes. The adaptive ERC approach is compared with fixed parameter ERC, and the difference in network bandwidth usage is shown in FIG. 7 and FIG. 8, where peer reliability is 50% and 99%, respectively. Compared with using a fixed ERC number of fragments of k=1 (non ERC), 8, 32 and 256, the adaptive ERC method may improve the efficiency by an average of 61%, 26%, 25% and 50% for peer reliability of 50%, and 50%, 18%, 29% and 57% for peer reliability of 99%. The improvement in efficiency is significant.

Figure 9:
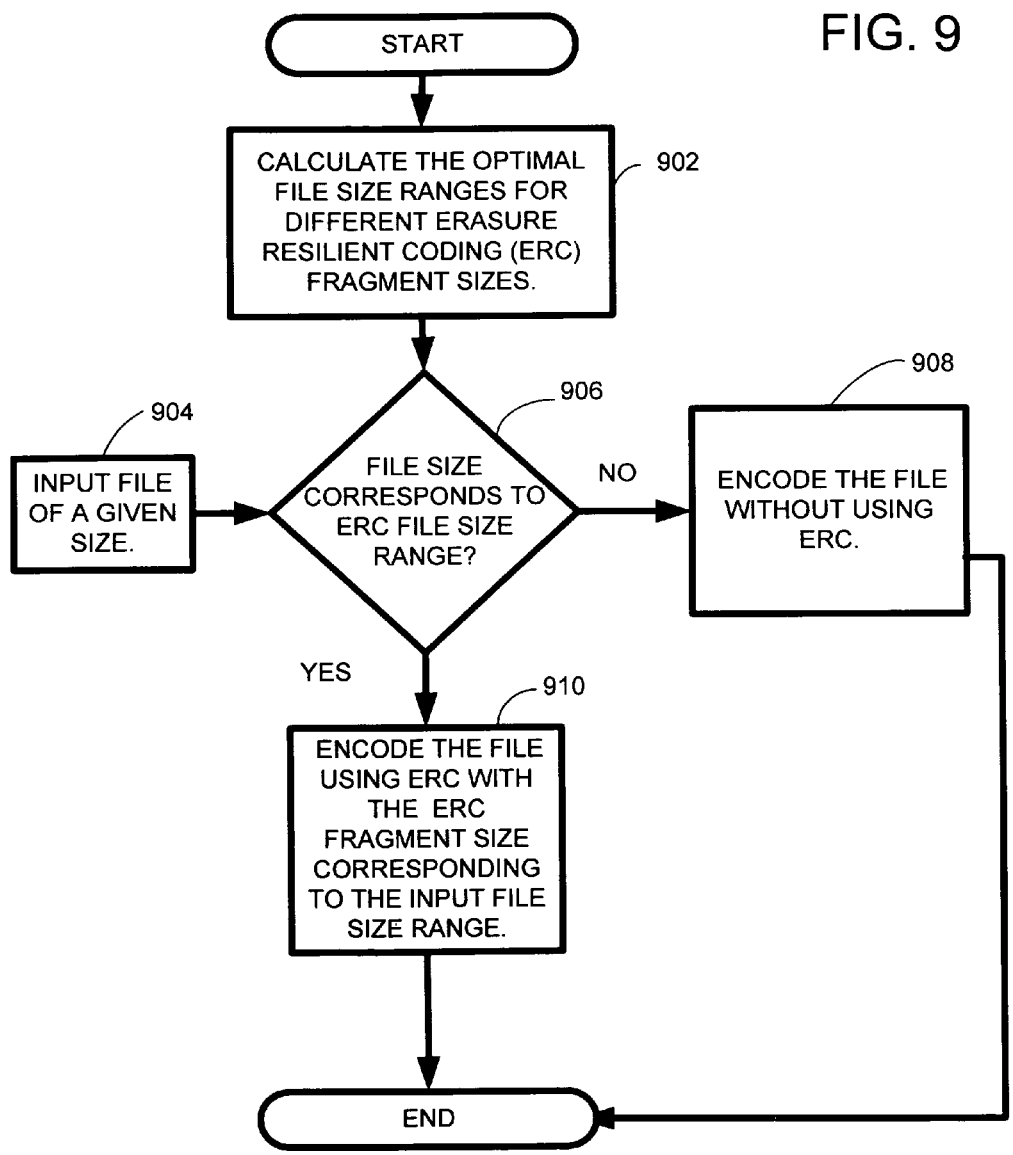
FIG. 9 depicts one embodiment of the adaptive coding storage process.

In the most general sense, one embodiment of the adaptive coding storage process is shown in FIG. 9. As shown in process action 902, the adaptive coding storage system calculates optimal file size boundaries for a different number of fragments. A file of a given file size to be encoded is input (process action 904). A check is made as to whether the input file size corresponds to non-erasure coding (k=1), as shown in process action 906. If the input file size does not correspond to ERC, the file is encoded without using ERC (process action 908). If the file size corresponds to an ERC file size range, the file is encoded using ERC coding and the number of fragments corresponding to the file size of the input file, which is the optimum number of fragments for that size file (process action 910).

Figure 10:
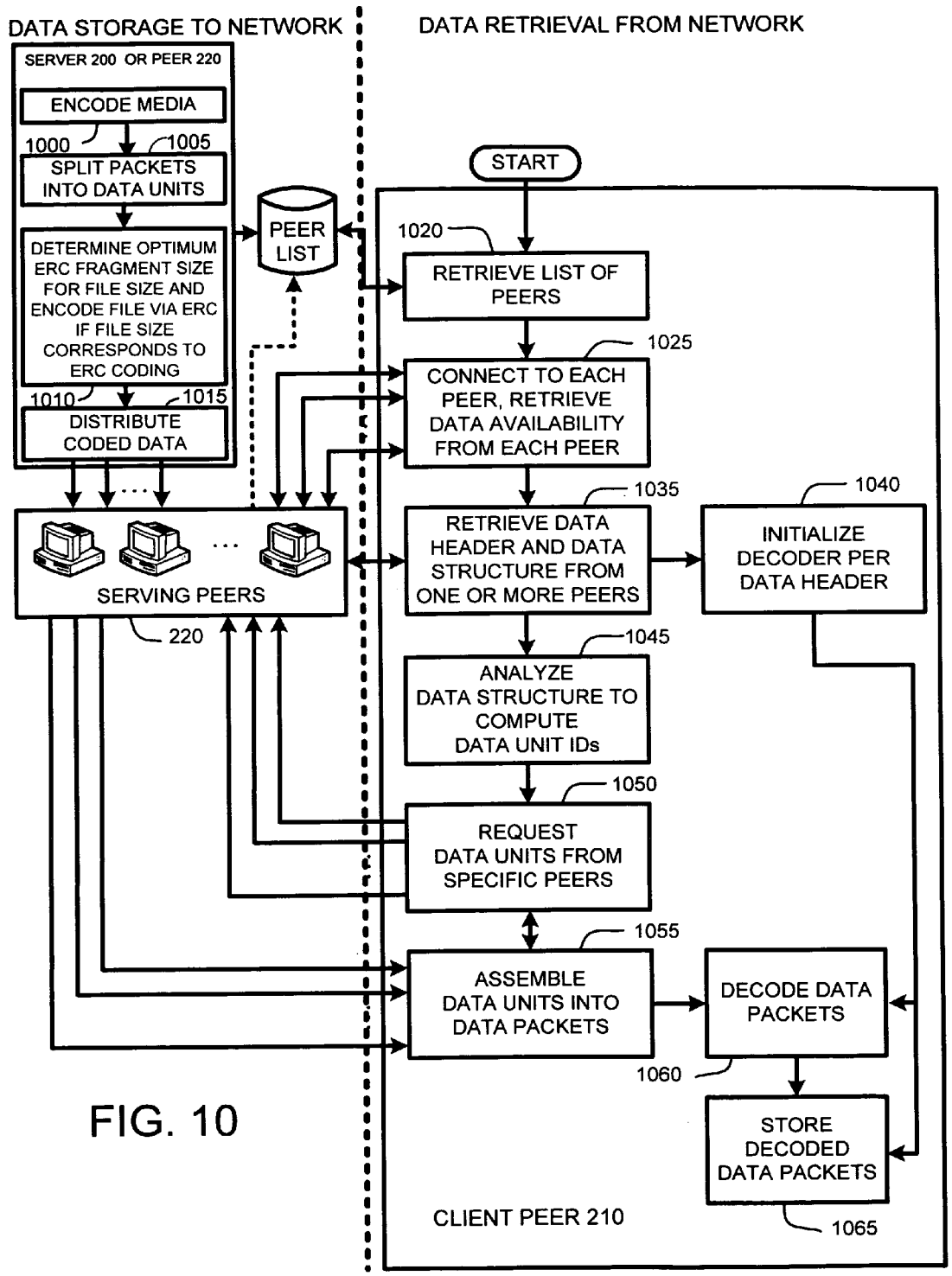
FIG. 10 depicts an exemplary operational flow diagram showing how the adaptive coding storage technique is employed in a P2P network.

A major application of the adaptive ERC process described herein is in P2P back up or restore. A peer may back up files to other peers in a network and then restore these files by retrieving them from peers in the network in case they are lost (for example, in case they are lost in a computer crash). In general, FIG. 10 illustrates an exemplary operational flow diagram showing how the adaptive coding storage technique can be employed in a P2P system. It should be noted that any boxes and interconnections between boxes that are represented by broken or dashed lines in FIG. 10 represent alternate embodiments of the adaptive coding storage system described herein, and that any or all of these alternate embodiments, as described below, may be used in combination with other alternate embodiments that are described throughout this document.

In particular, as illustrated by FIG. 10, prior to data transfer operations, such as when it is desired to back up data to peers in a network, the server 200 or peer 220 encodes 1000 the data to be transferred to the other peers for storage. The adaptive coding storage system is capable of operating with any of a number of conventional codecs, such as, for example, MPEG 1/2/4, WMA, WMV, etc. In addition, during the encoding process 1000, the server 200 or peer 220 also generates both a data header, and a companion file containing the data structure.

As described above, in one embodiment, once the data is encoded 1000, the encoded data packets are split 1005 into a number of data units of a fixed size. Further, as with the encoded data, the data header and the data structure are also split 1005 into a number of data units of the same fixed size as used to split the encoded data packets. Splitting 1005 this information into fixed length data units allows for the peers to pre-allocate memory blocks prior to data transfer operations, thereby avoiding computationally expensive memory allocation operations during the data transfer process. Further, the use of smaller data units allows for finer control by the client or peer storing the data over the exact amount of bandwidth expended by each peer to meet client data unit requests during data transfer operations.

In addition to splitting 1005 the encoded data, the data header, and the data structure into smaller data units, if erasure resilient coding is employed, an additional layer of coding is used to provide increased redundancy in a typical P2P environment where serving peers are inherently unreliable. In particular, as described above, in one embodiment, if erasure resilient coding is determined to be appropriate for the data file, the data units are further divided into a number of data blocks and an erasure resilient coding process 1010 is used to encode the file.

The use of such coding 1010 ensures that one or more of the peers will have the data blocks necessary to reconstruct particular data units while simplifying the demand on the client to identify which of the peers contains the necessary data. Further, in one embodiment, the erasure resilient coding keys used by each serving peer 220 are automatically assigned to each peer by the server 200. However, in another embodiment, each serving peer 220 simply chooses an erasure resilient coding key at random. These keys are then retrieved by the client 210 when each peer 220 is initially contacted by the client.

Once the data file has been initially encoded 1000, split into data units 1005, and possibly further erasure coded 1010, the resulting data units or data blocks are then distributed 1015 to the various peers 220. This distribution 1015 can be deliberate in the sense that the blocks or packets of the encoded data are simply provided in whole or in part to a number of peers where it is then cached or stored for future data transfer when called by a client who wishes to retrieve the data.

Once the data has been distributed 1015 to the serving peers 220, the client 210 then is ready to begin data requests to those peers in the case that the client wishes to retrieve this data from storage. Further, as noted above, the server 200 can also act as a peer 220 for the purposes of transferring data to the client 210.

At this point, the client 210 begins a data transfer session by first retrieving a list of available serving peers 220. This list is retrieved directly from the server 200, from one of the peers 220, or by using a conventional distributed hash table (DHT) method for identifying potential serving peers. Once the client 1010 has retrieved the list of peers, the client then connects to each serving peer 220 and retrieves 1025 a list of available files from each peer. Once the client 210 has retrieved the list of available files of each peer 220, the client then retrieves 1035 the data header and data structure of the data to be transferred from one or more of the peers by requesting data units corresponding to that information from one or more of the peers via a network connection between the client and those peers.

The data header generally contains global information describing the data, e.g., the number of channels in the data, the properties and characteristics (audio sampling rate, video resolution/frame rate) of each channel, codecs used, author/copyright holder of the media, and so on. Consequently, retrieval of the data header at the start of the data transfer session allows the client 220 to set up or initialize 1040 the necessary tools to decode 1065 the subsequently received packets prior to receipt of those packets during the data transfer session.

Further, after retrieving 1035 the data structure of the particular data, the client analyzes that data structure and calculates data unit IDs 1045 of data units of the transferred data that will need to be requested during the data transfer process. The client 210 then requests those data units 1050, one by one, from one or more of the peers 220.

Finally, once all of the data units constituting a particular data packet have been retrieved in accordance with the client 210 request 1050, those data packets are reassembled 1055 into the original data packet. Reassembled data packets are then decoded 1060 and can be restored 1065 on the client 210.

3.0 P2P Storage: Policies and Design Strategies

In addition to adjusting the ERC number of fragments based on the file size to be stored in a P2P network, efficiency can also be improved. Various embodiments of the adaptive coding storage system described herein are designed to improve storage efficiency by employing certain strategies as are described below. These strategies can be employed in conjunction with the adaptive coding storage system or be employed in any P2P network.

3.1 P2P Storage Cost.

In this section, storing a file in a P2P network is compared to storing the file directly in a "six nine" reliable server. One observes that the P2P solution reduces the server bandwidth and cost, but requires the peer to spend more bandwidth to distribute the file into the P2P storage. The overall use of network bandwidth increases in P2P solution. The increase in the upload bandwidth of the client can be considered a cost of the P2P storage system. This cost for different peer reliabilities and file sizes is tabulated in Table 1.

TABLE 1

Cost of increased bandwidth usage in P2P.

| Reliability | File Size | | | | |
|---|---|---|---|---|---|
| | 10 KB | 100 KB | 1 MB | 10 MB | 100 MB |
| 10% | 332.9 | 79.1 | 29.5 | 16.5 | 12.5 |
| 50% | 51.0 | 12.11 | 4.34 | 2.23 | 1.56 |
| 99% | 9.4 | 1.87 | 0.65 | 0.22 | 0.09 |

One observes that the cost of using P2P storage is small if the peer reliability is high and the file size is large. For example, storing 100 MB of file to peers with reliability of 99% only incurs 9% cost. However, when the peer reliability is low and the file size is small, the cost can be significant.

3.2 P2P Storage Policies.

From Table 1, one may derive the following policy of using the P2P storage cloud:

a) One should use unreliable peers for storing large files, and use reliable peers for storing small files. The cost to the P2P system will be smaller if one allocates large files to unreliable peers, and assigns smaller files to reliable peers.

b) One should use unreliable peers for storing static files, and use reliable peers for storing dynamic files. One calls those files that do not change as static, and calls those files that change constantly as dynamic. Multiple small static files can be bundled into a large static file and stored in the P2P storage cloud. The same strategy is not effective for dynamic files, as the change of a single file requires that the entire combined file to be updated.

A corollary of this policy is that if one uses the P2P network to store the state of an application, peer status information, and so on, one should divert the information to the most reliable peers of the network. If one restricts that the file that contains the state of the application only be placed in high reliable peers (in essence, the high reliable peers will form a sub-network that constitute the cores of the extended P2P network), one may greatly reduce this replication ratio and the cost of updating the status file, and improve the efficiency.

c) Unreliable peers should be allowed to distribute less, and reliable peers should be allowed to distribute more.

d) Smaller files should be assigned a higher distribution cost, and larger files should be assigned with a lower distribution cost.

Policies c) and d) are for P2P backup and retrieval applications, where a peer may distribute content into the P2P storage cloud, and store content for other peers. A balanced P2P storage network should let each peer balance its contribution and benefit. In previous works it has been pointed out that bandwidth is the primary resource in the P2P storage application. Let the contribution of the peer be the amount of coded fragments that it receives and stores for the other peers. Let the benefit of the peer be the amount of content that it distributes into the P2P cloud. Taking into consideration that low reliability leads to more redundant data storage, one should punish unreliable peers so that they will be allowed to distribute less, and reward reliable peers so that they will be allowed to distribute more. Such policy may have a positive benefit in P2P economy, as it may encourage the user to keep the P2P application online, thus improving the overall reliability of the P2P network and reducing the replication ratio required.

One may also punish the distribution of a small file by assigning it with a high distribution cost, requiring the peer to proportionally contribute more; and reward the distribution of large file by assigning it with a low distribution cost, letting the peer contribute proportionally less. As a corollary, P2P backup applications should be designed to minimize backup frequency. Instead of immediately updating the file right after its change, one may consider bundling multiple changes into a large file, and updating it only once, say every midnight, into the P2P storage cloud.

Figure 11:
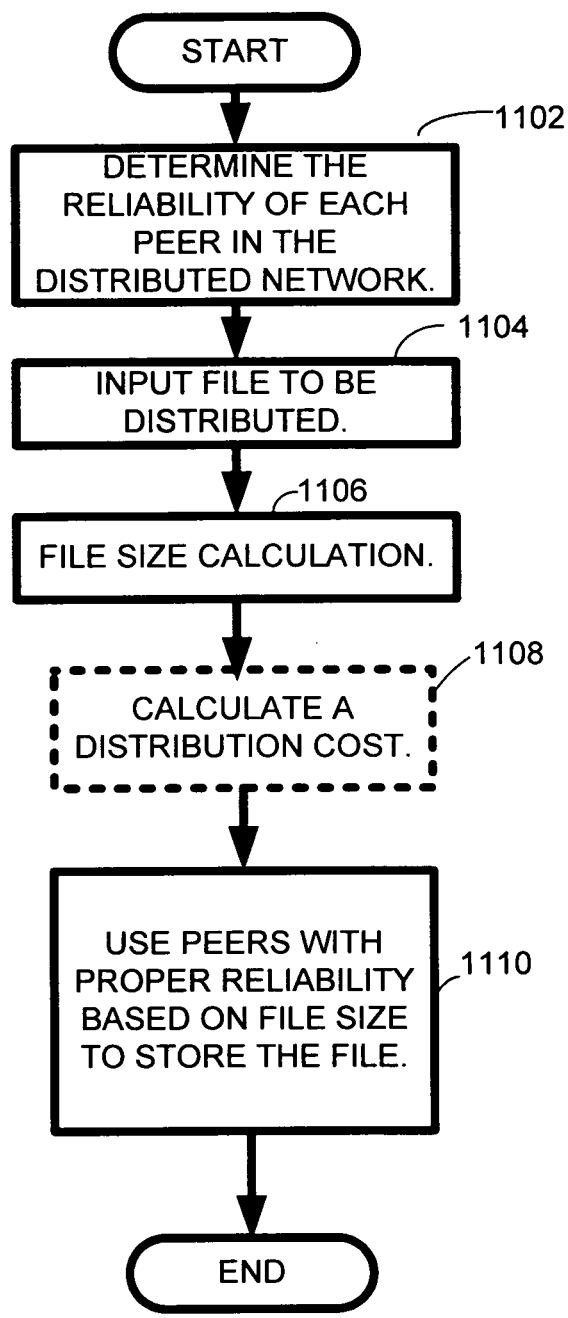
FIG. 11 depicts an embodiment of the adaptive coding storage system and process that implements a procedure to optimize the storage efficiency of a P2P network.

One embodiment of the adaptive coding storage system and method that is designed around the above policies is shown in FIG. 11. As shown in process action 1102, the reliability of each peer in the distributed or P2P network is determined. A file to be distributed or stored is input (process action 1104). The size of the file is evaluated (process action 1106), and a distribution cost is assigned to the file based on the expected storage bandwidth in equation (7) (process action 1108). If the file is a large file, a higher distribution cost can be assigned. If the file is small, the file can be assigned a lower distribution cost. Based on the size of the file, the adaptive coding storage system will choose peers with proper reliability to store the file (process action 1110). That is, the peers whose reliability is below a given threshold are used to store and distribute the large file, and peers whose reliability is above a given threshold are used to store and distribute the small file.

Figure 12:
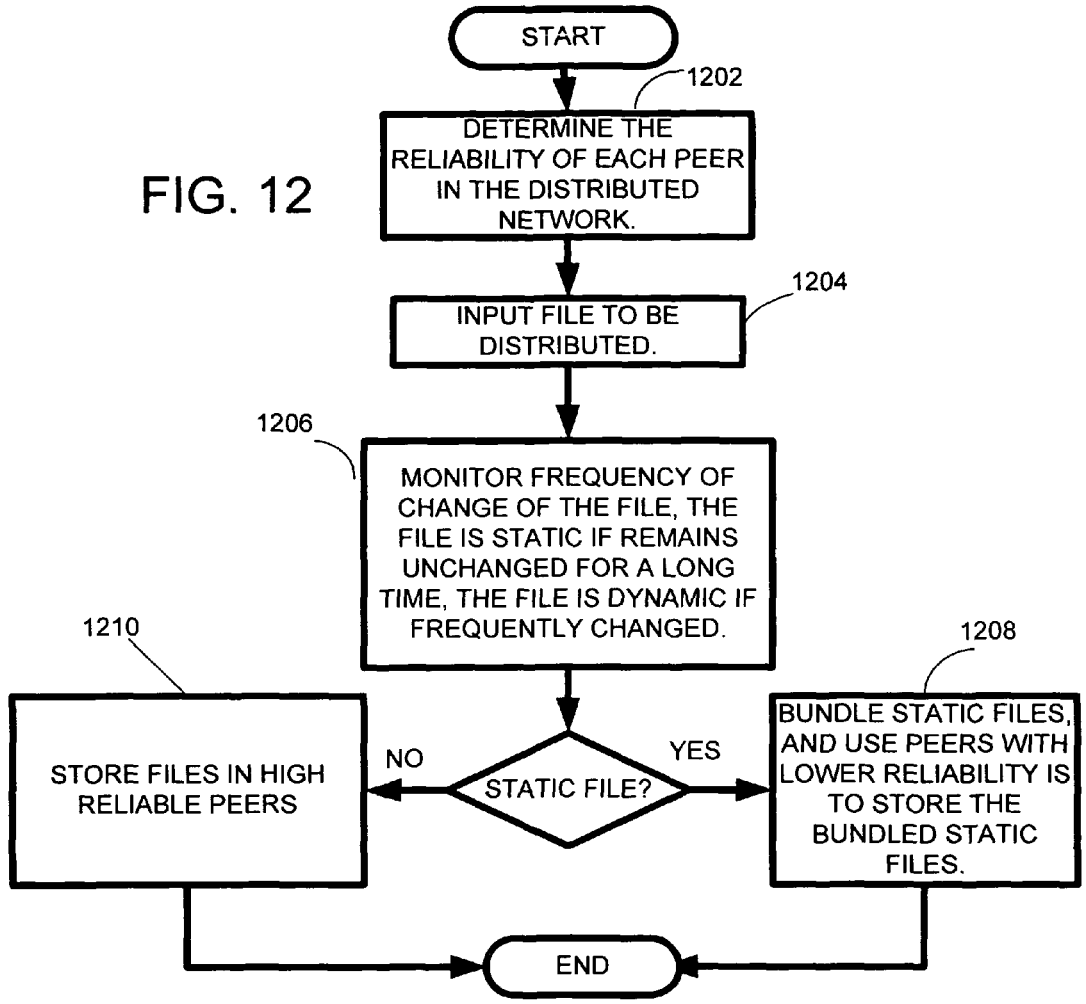
FIG. 12 depicts another embodiment of the adaptive coding storage system and method that implements procedures to optimize the storage efficiency of a P2P system.

Another embodiment of the adaptive coding storage system and method that is designed around the above policies is shown in FIG. 12. As shown in process action 1202, the reliability of each peer in the distributed or P2P network is determined. A file to be distributed or stored is input (process action 1204). The file is compared to the same file that was previously stored to determine if the file is static or dynamic (process action 1206). The first time that the file is deposited, it is assumed that the file is dynamic. If frequent changes to the file are observed, the file remains designated as dynamic. If it is observed that the file does not change for a prolonged period of time, the file is designated as static. The dynamic files are stored in highly reliable peers (process action 1210). (Thus, at first, files will be stored in servers or highly reliable peers.) Once it is observed that the files do not change, and they become static, these static files will be redistributed, and stored in lower reliability peers.

It should be noted that the embodiments shown in FIGS. 11 and 12 can be used alone or in combination in order to increase the overall efficiency and reliability of a distributed or peer-to-peer network.

3.3 P2P Storage with Server Component Support.

If a server component is used in complement of the P2P network, one may use P2P storage for large and static files, and use the server for small, dynamic files. Since it is the large files that consume most of the server resource, P2P storage complements the server well.

Figure 13:
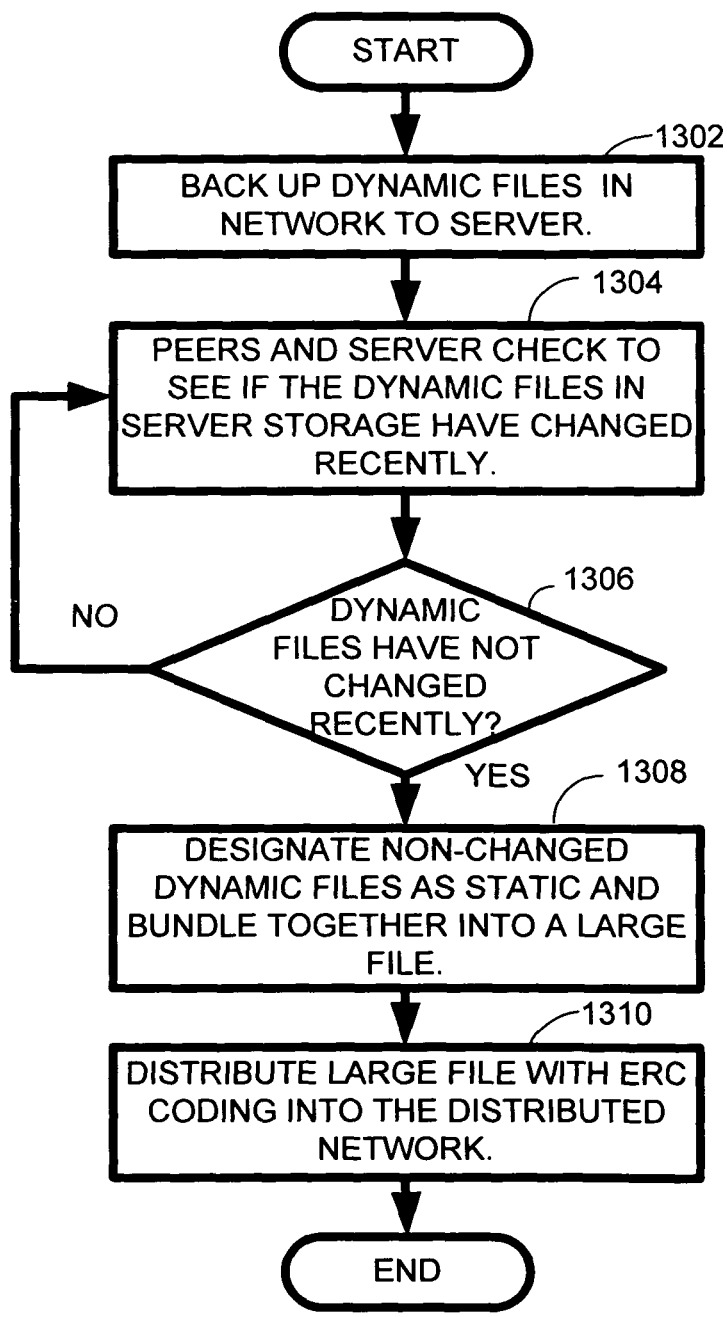
FIG. 13 depicts an embodiment of the adaptive coding storage system and method that employs P2P backup with server support.

As shown in FIG. 13, one embodiment of the adaptive coding storage system and process employs P2P backup with server support. As shown in FIG. 13, the dynamic files in the network are backed up to the server (process action 1302). The client and/or the server may then automatically detect those dynamic files that are not changed any more and are turning into static files (process action 1304, 1306). These detected static files may then be bundled together into a large file, as shown in process action 1308, and be distributed with ERC into the P2P storage cloud (process action 1310). This effectively increases the size of the file stored in the P2P cloud. Combined with ERC of a large number of fragments, this may improve the efficiency.

The embodiment shown in FIG. 13 can be used alone or in combination with the embodiments shown in FIGS. 11 and 12 to increase the overall efficiency and reliability of a distributed or peer-to-peer network. It should also be noted that this embodiment can be used both with erasure resilient coding and without it.

It should be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for encoding files to be stored in a distributed network, comprising:
    using a computing device to perform the process actions of:
        calculating optimal approximate file size ranges corresponding to different erasure resilient coding (ERC) number of fragments, by determining a boundary between different numbers of fragments as the optimal file size suited for a particular ERC number of fragments;
        inputting a file of a given file size,
            if the file size of the input file is smaller than a range of file sizes for a smallest erasure resilient coding (ERC) number of fragments of two, not using erasure resilient coding for the file, wherein an ERC number of fragments corresponds to the number of fragments used for ERC coding of the file; and
            if the file size of the input file corresponds to one of the optimal approximate erasure resilient file size ranges,
                encoding the input file using erasure resilient coding and an optimal number of fragments corresponding to the approximate file size range of the input file, wherein for each of multiple different file sizes, a corresponding optimal number of fragments for the respective file size is predetermined based on an overall network bandwidth needed to store a file on a number of peers in the distributed network, wherein different approximate file size ranges correspond to different erasure resilient coding numbers of fragments, and wherein each number of fragments is the optimal number of fragments for a corresponding range of file sizes; and
                storing the encoded file.

2. The computer-implemented process of claim 1 further comprising the process action of sending the encoded file to one or more peers in a distributed network.

3. The computer-implemented process of claim 1 further comprising computing the number of peers that the encoded file will be stored to according to peer reliability and desired reliability of file content.

4. The computer-implemented process of claim 1, further comprising the process actions of:
    obtaining a set of file fragments of the encoded file equal to or greater than a number of fragments that the file is split into for encoding; and
    decoding the encoded file fragments with erasure resilient decoding if the file was erasure resilient coded to obtain a decoded version of the encoded file; and
    decoding the encoded fragments without erasure resilient decoding if the file was not erasure resilient coded to obtain a decoded version of the encoded file.

5. The computer-implemented process of claim 1 wherein the erasure resilient coding used in encoding the file is Reed Solomon coding.

6. The computer-implemented process of claim 5 wherein:
    if the file size less than approximately 10KB, erasure resilient coding is not used;
    if the file size is approximately 10KB to 33KB, the optimum number of fragments is two;
    if the file size is approximately 33KB to 100KB, the optimum number of fragments is four;
    if the file size is approximately 100 KB to 310KB, the optimum number of fragments is eight;
    if the file size is approximately 310KB to 950KB, the optimum number of fragments is sixteen;
    if the file size is approximately 950KB to 2.9MB, the optimum number of fragments is thirty two;
    if the file size is approximately 2.9MB to 8.9 MB, the optimum number of fragments is sixty four;
    if the file size is approximately 8.9 MB to 26 MB, the optimum number of fragments is one hundred and twenty eight; and
    if the file size is greater than approximately 26 MB, the optimum number of fragments is two hundred and fifty six.

7. A system for improving the storage reliability and efficiency of a peer-to-peer network, comprising:
    a general purpose computing device;

a computer program comprising program modules executable by the general purpose computing device, wherein the computing device is directed by the program modules of the computer program to:
  determine the optimum number of fragments to encode a file of a given file size from a set of files of different sizes with erasure resilient coding by employing sub-modules to:
    determine an optimum approximate file size range for each possible erasure resilient coding number of fragments, wherein each number of fragments is the optimum number of fragments for the corresponding approximate range;
    determine into which approximate file size range the size of an input file falls;
    use as the optimum number of fragments corresponding to the optimum approximate file size range into which the size of the input file falls,
  wherein for each of multiple different file sizes, a corresponding optimal number of fragments for the respective file size is predetermined based on an overall bandwidth needed to store the file on a number of peers in the peer-to-peer network, wherein different approximate file size ranges correspond to different numbers of fragments and wherein each number of fragments is the optimal number of fragments for a corresponding approximate range of file sizes;
    if the optimum number of fragments to encode the file with erasure resilient encoding is one, do not encode the file with erasure resilient coding;
    if the optimum number of fragments is larger than one, encode the file by using the optimum number of fragments and using erasure resilient coding; and
    store the encoded file.

8. The system of claim 7 further comprising a program module to compute the number of peers that the encoded file fragments will be stored to according to peer reliability and desired reliability of file content.

9. The system of claim 8 further comprising a program module to distribute the file encoded with erasure resilient coding to one or more peers on a network.

10. The system of claim 9 wherein the program module to distribute the file comprises sub-modules to:
  determine the reliability of each peer in the distributed network;
  determine the size of the file;
  and use one or more peers with proper reliability as determined by file size to distribute the file.

11. The system of claim 9 wherein the program module to distribute the file comprises sub-modules to:
  if the file is large, use peers whose reliability is below a given threshold to distribute the large file; and
  if the file is not large, use peers whose reliability is above a given threshold to distribute the file.

12. The system of claim 9 wherein the program module to distribute the file comprises sub-modules to:
  determine the reliability of each peer in the distributed network;
  determine if the file is static;
  if the file is static, use peers whose reliability is below a given threshold to distribute the file; and
  if the file is not static, use peers whose reliability is above a given threshold to distribute the file.

13. The system of claim 9 wherein the program module to distribute the file comprises sub-modules to:
  determine the reliability of each peer in the distributed network;
  monitor changes of the file;
  first distribute the file to more reliable peers;
  if the file is observed not to change, redistribute the file to less reliable peers.

14. The system of claim 7 further comprising a program module to improve efficiency of the distributed network using a server, further comprising sub-modules to:
  back up all dynamic files in the distributed network to the server;
  periodically have peers and the server in the distributed network check to see if the dynamic files backed up to the server have changed;
  if the dynamic files have not changed, designate these files as static and bundle them together into a large file; and
  distribute the large file with erasure resilient coding to the distributed network.

15. A computer-implemented process for decoding an encoded file stored in a distributed network, comprising:
  using a computing device to perform the process actions of:
    calculating optimal approximate file size ranges corresponding to different erasure resilient coding (ERC) number of fragments, by determining a boundary between different numbers of fragments as the optimal file size suited for a particular ERC number of fragments;
    retrieving a set of fragments of an encoded file equal to or greater than the number of fragments that were used to encode the file, wherein the file was erasure resilient encoded with an optimum number of fragments for a given file size as determined based on an overall network bandwidth needed to store the file on a required number of peers in the distributed network and wherein the encoded file fragments were stored at a number of peers that was determined according to peer reliability and desired reliability of file content; and
    decoding the encoded fragments with erasure resilient decoding to obtain a decoded version of the encoded file.

16. The computer-implemented process of claim 15 wherein at least some of the encoded fragments are retrieved from a storage medium of one or more peers in the distributed network.

17. The computer-implemented process of claim 15 wherein at least some of the encoded fragments are retrieved from a storage medium of a server on the distributed network.

* * * * *